Nov. 26, 1968
M. H. CANNING
3,412,822
VEHICLE POWER STEERING SYSTEM
Filed Aug. 15, 1967
2 Sheets-Sheet 1
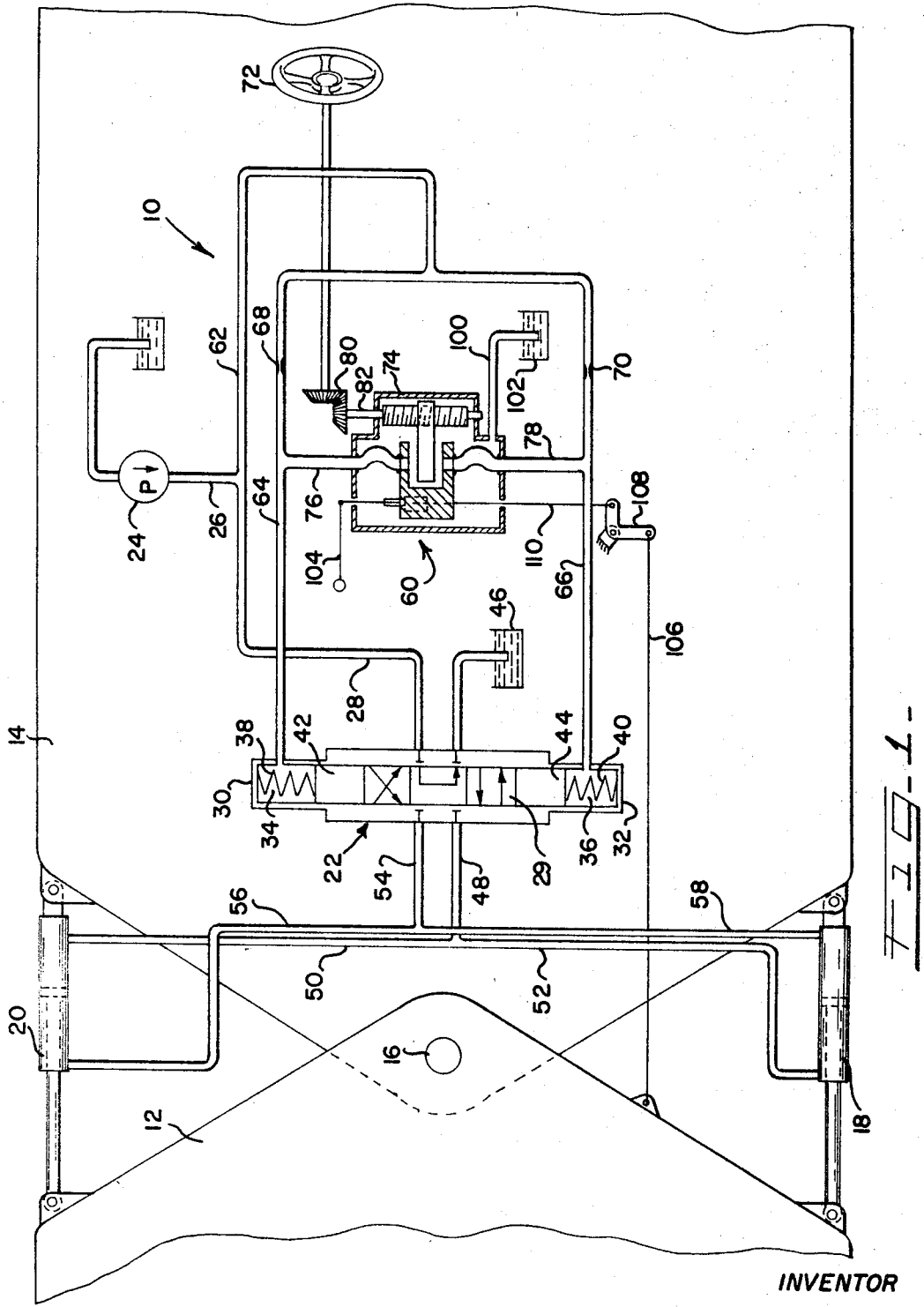
INVENTOR
MICHAEL H. CANNING
BY Richard E. Baskins
ATT'Y.

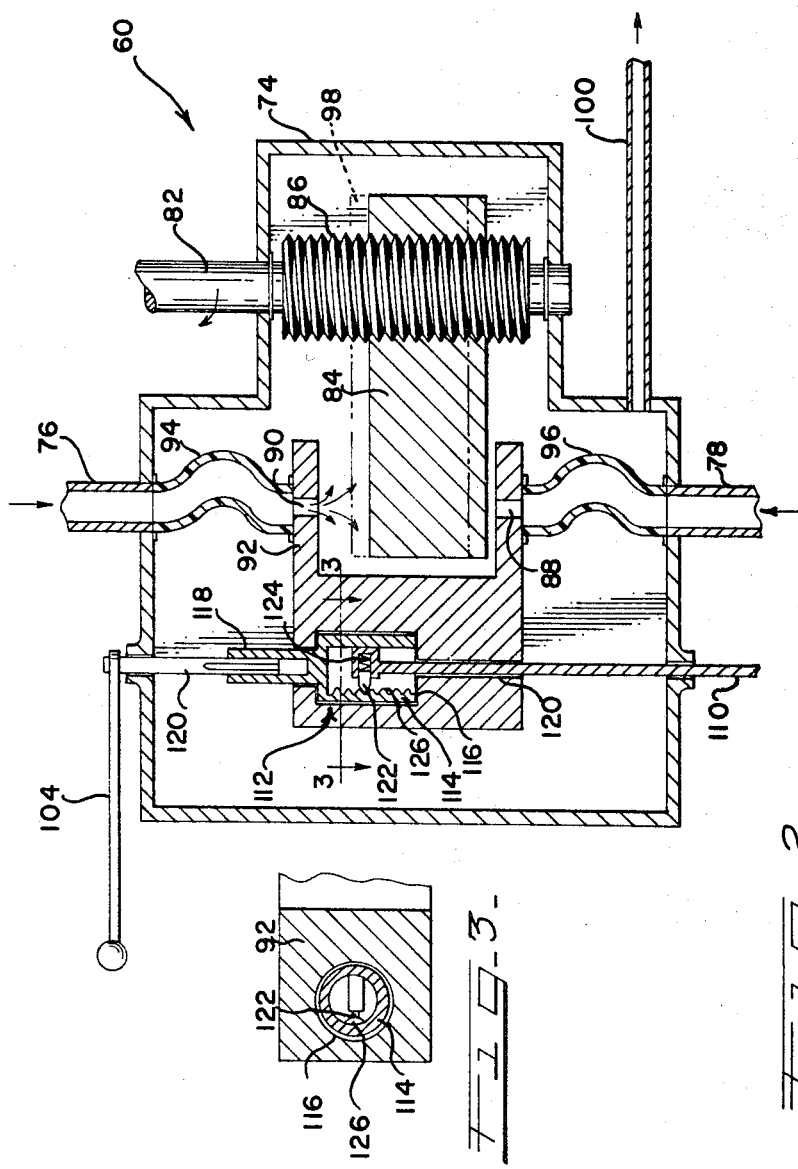

United States Patent Office 3,412,822
Patented Nov. 26, 1968

3,412,822
VEHICLE POWER STEERING SYSTEM
Michael H. Canning, Libertyville, Ill., assignor to International Harvester Company, Chicago, Ill., a corporation of Delaware
Filed Aug. 15, 1967, Ser. No. 660,816
7 Claims. (Cl. 180—79.2)

ABSTRACT OF THE DISCLOSURE

A power steering system for a vehicle having a pilot operated steering control valve operated under influence of a flapper type pilot control valve producing pilot control pressures responsive to steering signals initiated by the operator. The system provides selective follow-up action by displacing elements of the pilot control valve relative to the flapper responsive to steering movements of the vehicle. When a fast steering mode is desired the follow-up function may be quickly deactivated.

BACKGROUND OF THE INVENTION

Various proposals have been advanced in the prior art to control power steering on a vehicle. Among these is the device disclosed in Patent No. 2,981,356 wherein a valve operated by the steering wheel controls the steering motors with a mechanical follow-up linkage serving to neutralize the valve upon movement of the wheels for steering. Another device is that shown in Patent No. 3,202,238 in which steering wheel movement produces fluid pressure for operating a pilot operated steering valve with follow-up action produced by hydraulic pistons actuated by the steering linkage upon a steering movement and fluidly connected with the pilot operated valves. Another system is disclosed in Patent No. 2,583,197 in which steering speed is varied by operating a pair of steering valves connected with a pair of hydraulic pumps in the steering control circuit. In the former two patents steering speed is constant since only one pump is provided and the follow-up assembly is in continual engagement, while in the latter patent, with two pumps in operation, steering speed may be varied but at the expense of providing the additional pump and complicated steering controls. There is no provision in the prior art for providing a steering control system which selectively achieves fast or slow steering speed with a single pump circuit having a simple and inexpensive design.

SUMMARY OF THE INVENTION

This invention provides a simplified power steering control system incorporating pilot operated control valves operated under influence of control fluid pressure produced by a flapper valve assembly. The flapper valve operates responsive to steering signals developed by the operator to create the control fluid pressure as desired. The steering signals move the flapper valve relative to a pair of orifices bleeding control fluid from the system to produce either balanced control pressure for no steering or unbalanced control pressure for steering operation. Follow-up is provided through a linkage connected with the steering means so that the orifices are moved relative to the flapper upon a steering movement to cancel the unbalance in pressure. The follow-up means may be selectively disengaged from the orifices so that fast steering is provided as required.

Applicant's invention provides an improved steering control system which will effectively provide incremental steering control through a pilot operated steering valve in association with a follow-up device. The follow-up may be rapidly deactivated through manipulation of a simplified control arrangement. This affords a fast steering mode without the requirement for a dual pump system.

Applicant's invention has application in vehicles such as construction equipment encountering varied operating conditions. For example, logging vehicles when driven over roads or relatively firm terrain would utilize the steering arrangement with the usual follow-up operation. However, under extremely muddy conditions the operator of an articulated vehicle will find it desirable to select the fast steering mode so that the vehicle may "walk" by means of rapid angulation of the frame sections.

DESCRIPTION OF THE DRAWINGS

FIGURE 1 is a top plan view of a preferred articulated vehicle showing a schematic diagram of a steering control system incorporating features of the invention;

FIGURE 2 is an enlarged sectional view of a component element of the steering control system of FIGURE 1; and, FIGURE 3 is an enlarged sectional view of another element of the invention taken along the line 3—3 of FIGURE 2.

DESCRIPTION OF THE PREFERRED EMBODIMENT

Referring now to the drawings and particularly FIGURE 1 a steering control system according to the present invention is designated generally at 10. Control system 10 is illustrated schematically as used with a typical articulated vehicle comprising frame sections 12 and 14 pivoted about vertical pivot axis 16. It is to be understood that applicant's steering control system has application in other types of steering, such as with a vehicle having dirigible wheels.

Steering of the preferred articulated vehicle is achieved through actuation of extensible hydraulic rams, or steering motors, 18 and 20 mounted on either side of the vehicle. The steering motors are operated under influence of the pilot operated steering control valve 22. Control valve 22 receives fluid under pressure from pump 24 through conduits 26 and 28 and directs it as required to pressurize the steering motors.

Control valve 22 comprises a spool 29 slidable between a neutral position, as illustrated in FIGURE 1, and first and second operating positions. The spool is moved between these positions by means of a pair of oppositely acting pilot control motors 30 and 32 positioned at either end of the spool. The control motors respectively comprise fluid chambers 34 and 36, centering springs 38 and 40, and pistons 42 and 44 acting against the spool ends.

With equal fluid pressure in chambers 34 and 36 the operating forces developed by the pilot control motors will be balanced and spool 29 will assume the neutral position in which steering fluid from conduit 28 is returned to reservoir 46.

For left steering the pressure in pilot control motor 30 is increased above that in motor 32 to urge spool 29 downward within the valve. Fluid from conduit 28 will now be directed into conduit 48 and branch conduits 50 and 52 for extension of ram 20 and retraction of ram 18.

For right steering the pressure in chamber 36 of motor 32 is increased above that of motor 30 to move spool 29 upward within the valve. This directs fluids from conduit 28 into conduit 54 and branch conduits 56 and 58 for retraction of ram 20 and extension of ram 18.

Control of the pressure balance between the pilot control motors 30 and 32 for steering purposes is regulated by means of the pilot control valve mechanism 60. Pressurized control fluid from pump 24 is directed through conduit 62 into a first control fluid path comprising branch conduit 64 leading to chamber 34 of motor 30 and a second control fluid path comprising branch conduit 66 leading to chamber 36 of motor 32. A pair of orifices 68 and 70 are provided in respective branch conduits to provide a reduced control fluid pressure in each path. The total flow resistance in the branch conduits and orifices are equal for both paths so that equal pressure is normally delivered to either end of steering control valve 22.

Pilot control valve 60 functions to vary the pressure difference between branch conduits 64 and 66 by means of bleeding fluid therefrom at a controlled rate responsive to steering control signals produced by operator manipulation of steering wheel 72. Control valve 60 comprises a valve housing 74 connected at either end with respective branch conduits 64 and 66 by means of bleed conduits 76 and 78. Left and right steering signals from steering wheel 72 are translated by means of miter gear set 80 into rotary motion of shaft 82 mounted in housing 74 of the control valve.

Details of the internal construction of pilot control valve 60 are shown in greater detail of FIGURE 2. A flapper valve 84 is mounted for vertical sliding movement within the housing responsive to rotation of shaft 82. This is achieved by threadably mounting flapper valve 84 on a worm gear 86 secured to shaft 82. A pair of equally sized orifices 88 and 90 are mounted in spaced relationship to respective lower and upper surfaces of flapper 84 by means of floating yoke 92. The orifices are in fluid communication with conduits 76 and 78 by means of flexible hoses 94 and 96.

When no steering signal is relayed from the steering wheel flapper 84 will be positioned equidistant between the orifices as illustrated in the broken line position 98 of FIGURE 2. In this position the flapper will present an equal resistance to flow from either orifice to maintain equal pressure in the two control paths and pilot control motors so that control valve 22 assumes its neutral condition.

Under influence of a right steering signal from the steering wheel shaft 82 will rotate worm 86 and move flapper 84 downward relative to yoke 92. This action will increase the resistance to flow through orifice 88 while decreasing the resistance through orifice 90. The pressure in hose 96, conduits 78 and 76, and pilot control motor 32 will now increase along with a decrease in pressure in the corresponding elements of the other control path. The forces produced by the pilot control motors will now be unbalanced so that spool 29 is shifted to its upper position where it will direct steering fluid to the rams for right steering. Fluid which is bled through the orifices is removed from housing 74 through drain 100 into reservoir 102.

The operator may rapidly select either normal steering with follow-up operation or fast steering without follow-up through manipulation of selector lever 104. Under follow-up operation pivotal steering movement of frame section 12 relative to frame 14 will operate follow-up rod 106, bell-crank 108, and link 110 which projects into housing 74 of control valve 60 (FIGURE 1). Movement of link 110 will displace yoke 92 with respect to flapper 84 and cancel the unbalanced pressure produced by control valve 60 so that spool 29 is returned to its neutral position to terminate steering operation. If the operator desires further steering angulation he must then again manipulate steering wheel 72 in the desired direction.

Under fast steering operation, as determined by the operator through manipulation of selector lever 104, movement of follow-up rod 106 and link 110 will be ineffective to cancel the unbalanced pressure produced by pilot control valve 60. This means that steering control valve 22 will continue to direct pressurized fluid to the rams for steering movement until the operator manipulates steering wheel 72 in a direction opposite that of the initial steering direction. Steering is thus "fast" in the sense that the operator need not continually turn the steering wheel after an initial steering signal in order to fully angulate the frame sections. This reduces the amount of effort and time required for the operator to quickly angulate the frames back and forth, as for example when it may be necessary to "walk" the vehicle through extremely muddy terrain.

Follow-up operation is selected through operation of lever 104 which engages and disengages locking device 112. Locking device 112 comprises a collar 114 mounted within cavity 116 formed in yoke 92. Stem 118 at the upper end of the collar projects outwardly through an opening in the yoke and is internally splined for an axial sliding connection with shaft 120 which is rotatably mounted on housing 74 and secured to lever 104.

Link 110 from the follow-up assembly projects through housing 74, through bore 120 formed in yoke 92, and into cavity 116 of the collar. A detent 122 mounted on the end of link 110 is urged by spring 124 outwardly against the inner surface of cavity 116.

When selector lever 104 is rotated to the position illustrated in FIGURE 2 for "follow-up" operation detent 122 will move into locking engagement with axially aligned teeth 126 formed internally within the collar. The detent and collar will thus move conjointly upon displacement of follow-up link 110 after initiation of a steering operation. This in turn will vertically displace yoke 92, which is free to move due to the splined connection at stem 118 and the flexibility of the hoses 94 and 96.

Assuming that a right steering signal has moved flapper 84 into the position illustrated in FIGURE 2 to pressurize conduit 78 as explained above, action of the steering motors will angulate frame section 12 to the right and in turn displace follow-up link 110 downwardly. The corresponding displacement of yoke 92 will again position orifices 88 and 90 equidistant from the opposing surfaces of the flapper. The flow through each orifice is therefore balanced so that the control pressures in both pilot control motors are equalized and spool 29 is returned to its neutral position to terminate steering operation.

For "fast" steering selector lever 104 is manipulated to turn collar 114 relative to detent 122 until teeth 126 are disengaged therefrom. In this mode of operation after a steering movement of the frame sections displacement of follow-up link 110 will not move yoke 92 since locking device 112 is disengaged. Thus flapper 84 will remain in the position illustrated after a right steering signal is received until cancellation thereof by a left steering signal.

This invention also contemplates a modified construction for control valve 60 in which steering signals displace the yoke and orifices relative to a floating flapper valve. Follow-up operation would be achieved by selectively locking follow-up link 110 with the flapper to cancel the unbalanced pilot control pressures.

What is claimed is:

1. A steering control system for use with a vehicle having steering means, the invention comprising the combination of: a pressurized fluid source; motor means to actuate the steering means; control valve means operable between a neutral condition, a first condition connecting the fluid source with the motor means for left steering, and a second condition connecting the fluid source with the motor means for right steering; operator controlled means to produce steering signals; a source of control fluid pressure; fluid pressure operated pilot motor means to operate the control valve means to its first condition responsive to a first control pressure, and to its second condition responsive to a second control pressure; means connected with the source of control fluid pressure to produce the first and second control pressures responsive to respective left and right steering signal; means to cancel the first pressure responsive to left vehicle steering and to cancel the second pressure responsive to right vehicle steering; and, other means to selectively render inoperable the means to cancel the pressures.

2. The invention as defined in claim 1 wherein the means to produce the control pressures comprises first and second control fluid paths, each path fluidly connecting the source of control fluid pressure with the pilot motor means, each path including an orifice, the orifices being spaced apart, each orifice adapted to bleed fluid from a respective path, and a flapper valve movable between the orifices responsive to the steering signals to selectively vary the rate of fluid bled from the paths.

3. The invention as defined in claim 2 wherein the means to cancel the pressures comprises follow-up means actuated by vehicle steering movement to move the orifices relative to the flapper valve to equalize the rate of fluid bled through the orifices.

4. The invention as defined in claim 3 wherein the other means comprises a link movable responsive to steering movement, support means constraining the orifices for movement in said spaced apart relationship to and from the flapper, and locking means to selectively lock and unlock the link for movement with the support means.

5. The invention as defined in claim 2 and further including a yoke supporting the orifices in the spaced apart relationship, a pair of flexible conduits, each conduit fluidly connecting an orifice with a fluid path, respectively.

6. The invention as defined in claim 5 wherein the means to cancel the pressures comprises linkage means to displace the yoke relative to the flapper valve responsive to the steering movement.

7. The invention as defined in claim 6 wherein the other means comprises locking means to lock and unlock the linkage means with the yoke.

References Cited

UNITED STATES PATENTS

| | | | |
|---|---|---|---|
| 2,557,066 | 6/1951 | Armington | 180—79.2 |
| 2,583,197 | 1/1952 | Armington | 180—79.2 |
| 2,896,734 | 7/1959 | Toth | 180—79.2 |
| 2,863,234 | 12/1958 | Armington | 180—79.2 |
| 3,249,174 | 5/1966 | Orwig | 180—79.2 |
| 3,312,301 | 4/1967 | Hagen | 180—79.2 |

BENJAMIN HERSH, *Primary Examiner.*

L. D. MORRIS, JR., *Assistant Examiner.*